United States Patent [19]

English et al.

[11] 4,389,815
[45] Jun. 28, 1983

[54] WICK SUPPORT FOR WICK-WATERING PLANTS

[76] Inventors: Roy L. English; Irene F. English, both of 1520 Anna Way, #58, Oxnard, Calif. 93030

[21] Appl. No.: 318,837

[22] Filed: Nov. 6, 1981

[51] Int. Cl.³ .............................................. A01G 9/00
[52] U.S. Cl. .......................................... 47/81; 47/79
[58] Field of Search ...................... 47/81, 79; 248/156, 248/545; 222/187; 210/294; 126/45, 46, 47, 48, 49; 431/102; 239/44, 45, 46, 50; 122/366; 411/907, 447

[56] References Cited

U.S. PATENT DOCUMENTS 1,974,160 9/1934 Pierson ................................. 411/907
2,695,474 11/1954 Barstow .................................. 47/81

FOREIGN PATENT DOCUMENTS 1030096 5/1958 Netherlands ............................ 47/81

Primary Examiner—Edgar S. Burr
Assistant Examiner—Bradley M. Lewis
Attorney, Agent, or Firm—Reagin & King

[57] ABSTRACT

A wick support is disclosed which is employed to support a wick used in wick-watering plants. The wick support insures proper insertion of the wick into the plant soil and also insures proper positioning of the wick in a water reservoir.

3 Claims, 5 Drawing Figures

WICK SUPPORT FOR WICK-WATERING PLANTS

BACKGROUND OF THE INVENTION

This invention relates to wick-watering of potted plants and, more particularly, to a wick support for use in wick-watering of potted plants.

Over the years, many methods have been devised for adding the proper amount of water to potted flowers and plants. The conventional method of adding water to the surface of the soil usually results in under-watering or over-watering of the plant. Improved methods of adding water to potted plants have been devised which employ a wick, one end of which is inserted into the soil and the other end of which freely extends from the bottom of the plant pot. The plant pot is placed into a second, outer pot containing a reservoir of water, whereby the free end of the wick extends into the water. This method of watering, known as wick-watering, relies on the capillary action of the wick to draw water into the soil only as needed, thus preventing over-watering. In addition, the reservoir in the outer pot is capable of supplying water to the plant for several weeks, minimizing the chances of under-watering.

While wick-watering offers an improvement over conventional watering, prior methods of implementing wick-watering possess several disadvantages. For example, when it is desired to adapt a potted plant to wick-watering, it is necessary to insert a wick into the soil through the bottom of the pot. This is usually accomplished by using a pointed instrument which is pushed into the bottom drain hole of the pot to form an opening in the soil for inserting the wick. In many cases, the wick tends to fall out of this opening, depriving the plant of water. In addition, this method of inserting a wick may result in inadequate depth of penetration of the wick into the soil so that the plant roots do not receive adequate water.

Another disadvantage of prior wick-watering methods is that there is no assurance that the free end of the wick is extended to the bottom of the water reservoir in the outer pot. For example, the wick may cling to the bottom or sides of the plant pot, whereby no water is transferred to the soil. Because most pots are opaque in construction, there is no way to determine the position of the free end of the wick once the plant pot is inserted into the outer pot.

Accordingly, it is an object of the present invention to provide a new and improved wick-watering system.

It is another object of the present invention to provide a wick support which insures proper insertion of the wick into the plant soil.

It is another object of the present invention to provide a wick support which insures proper positioning of the wick in a water reservoir.

SUMMARY OF THE INVENTION

The foregoing and other objects of the invention are accomplished by a wick support which includes a rigid section having a pointed end for piercing and holding a wick at a first location along the length of the wick. The support also includes a flexible section having a pointed end for piercing and holding the wick at a second location along the length of the wick. The rigid and flexible sections are joined together near the center of the support by a handle section. Flexible fins are also provided which project from the sides of the rigid section in an area adjacent the handle.

In operation, the user grips the support by the handle and inserts the pointed end of the rigid section, along with one end of the wick which has been previously attached thereto, into the soil through the drain hole in the bottom of the plant pot. The flexible fins pass through the drain hole and expand to hold the support in place. The flexible section of the support projects outward from the bottom of the plant pot and holds the wick in an extended position.

The flexible section bends easily so that it can conform to outer pots having various depths of water reservoirs. In addition, the flexible section enables the user to place the plant pot on a flat surface without the pot tipping over.

An alternate embodiment of the wick support is also disclosed, which is similar in construction to the preferred embodiment except that the flexible section of the preferred embodiment is replaced by a weight. The weight includes a pointed end for piercing and holding one end of the wick in an extended position so that it fully extends into the water reservoir when the plant pot is placed into the outer pot.

DESCRIPTION OF THE PREFERRED EMBODIMENT

Figure 1:
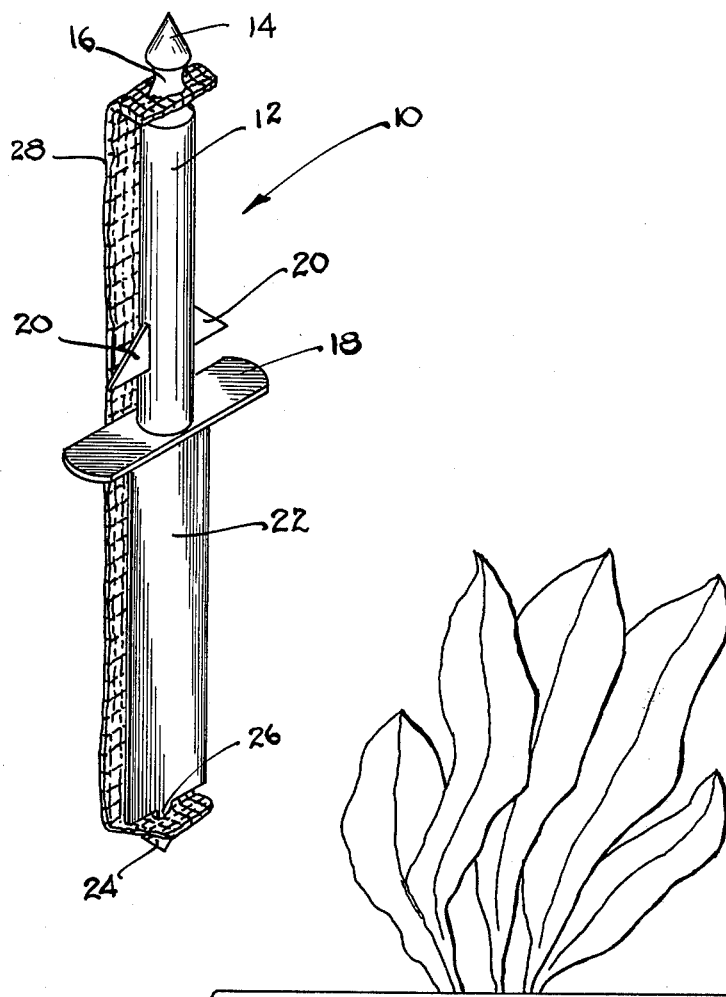
FIG. 1 is a perspective view of a wick support made according to the present invention, showing the wick attached.

Referring now to FIG. 1, there is shown a perspective view of a wick support 10, made according to the present invention. The support 10 includes a rigid section 12 having an elongated cylindrical form. One end of the section 12 is formed into a point 14. A grooved recess 16 is also provided in the section 12 adjacent the point 14. The opposite end of the section 12 terminates in a handle 18 having the form of a generally rectangular plate oriented in a plane perpendicular to the axis of the section 12.

Affixed to the outer surface of the rigid section 12 adjacent the handle 18 are two thin flexible fins 20. The fins 20 are triangular in shape and are axially aligned so that they project outward a greater distance nearest the handle 18. Projecting from the opposite side of the handle 18 is a flexible section 22 in the form of a thin rectangular sheet. One end of the flexible section 22 is formed into a point 24 having a narrow neck 26. The wick support 10 described above may be inexpensively molded using a variety of plastic materials such as vinyl, polyethylene or polypropylene.

To use the wick support 10, the user attaches one end of a wick 28 to the end of the rigid section 12 by piercing the wick 28 with the point 14. The wick is retained at the end of the rigid section 12 by the grooved recess 16. The wick may be formed of a number of materials, for example, polyester.

The opposite end of the wick 28 is attached to the end of the flexible section 22 in a similar fashion. The point 24 is used to pierce the wick 28, which is then retained by the narrow neck 26.

Figure 2:
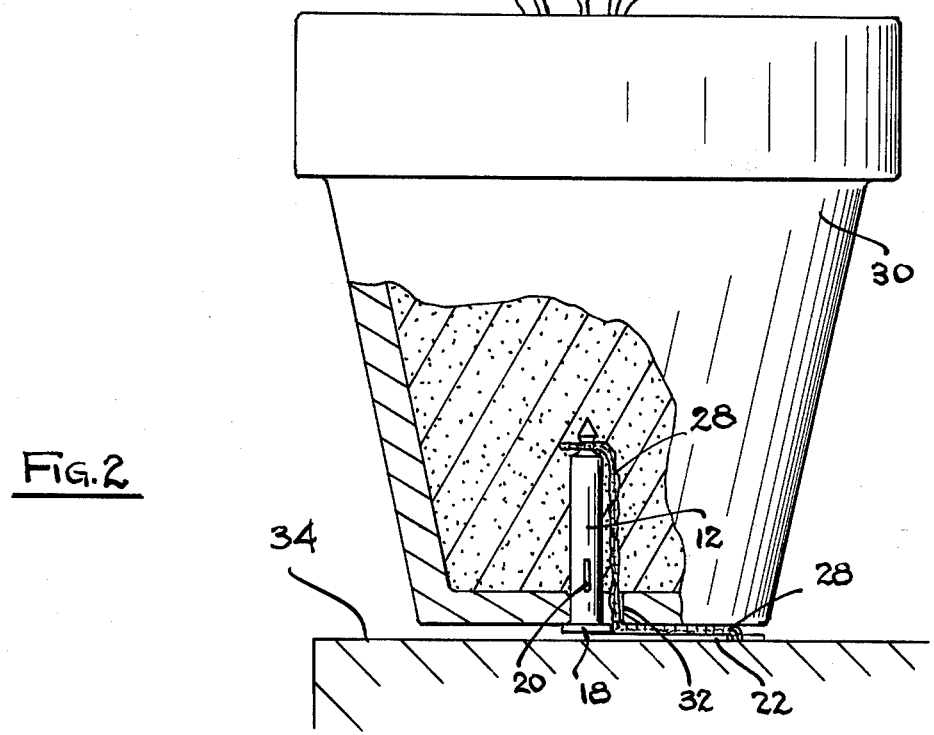
FIG. 2 is a side view of a plant pot partially cut away to show the wick and wick support inserted into the soil.

The wick 28 is inserted into the soil of a potted plant in the following manner. Referring to FIG. 2, the rigid section 12 of the support 10, is pushed into the soil within a plant pot 30 by gripping the support 10 by the handle 18 and inserting the point 14 through a drain hole 32 provided in the bottom of the pot 30 until the handle 18 is flush with the bottom of the pot 30. The point 14 aids in piercing the soil. The resilient fins 20 bend and pass through the drain hole 32 and then expand inside the pot 30 to lock the rigid section 12 and the wick 28 into the pot 30. The rigid section 12 may be fabricated in a variety of lengths to optimize the depth of penetration of the wick 28 for a range of sizes of plant pots 30.

As shown in FIG. 2, the pot 30 containing the support 10 may be placed on a flat surface 34 without tipping over. The flexible section 22 bends easily so that it lays flat under the pot 30.

Figure 3:
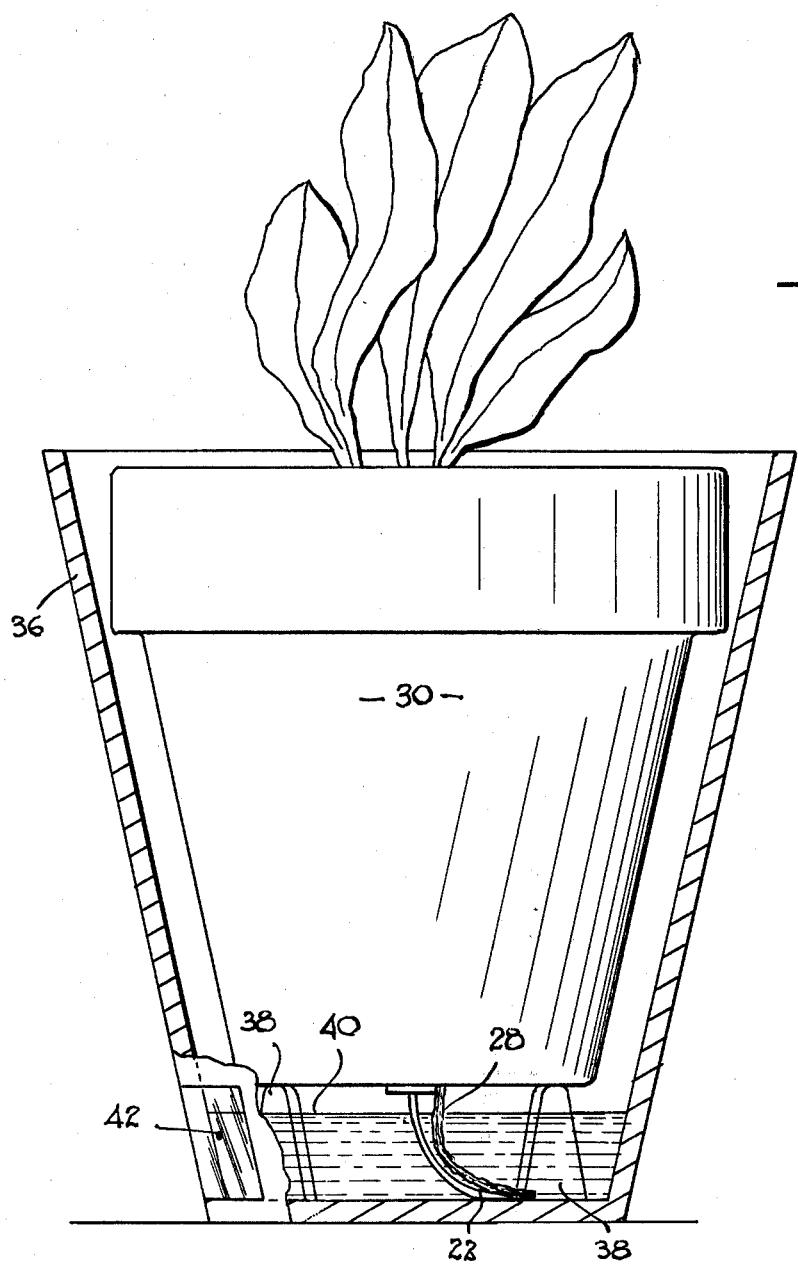
FIG. 3 is a side view of a plant pot placed within an outer pot, the view partially cut away to show the position of the wick and wick support.

FIG. 3 shows the position of the wick 28 and flexible section 22 when the pot 30 is placed into an outer pot 36 for wick-watering. The outer pot 36 is provided with spacers 38 which support the pot 30 above a water level 40. The outer pot 36 may also be provided with a transparent window 42 for viewing the water level 40. As shown in FIG. 3, the flexible section 22 ensures that the wick 28 extends to the bottom of the outer pot 36, and yet is flexible enough to conform to a wide variation in the height of the spacers 38.

Figure 4:
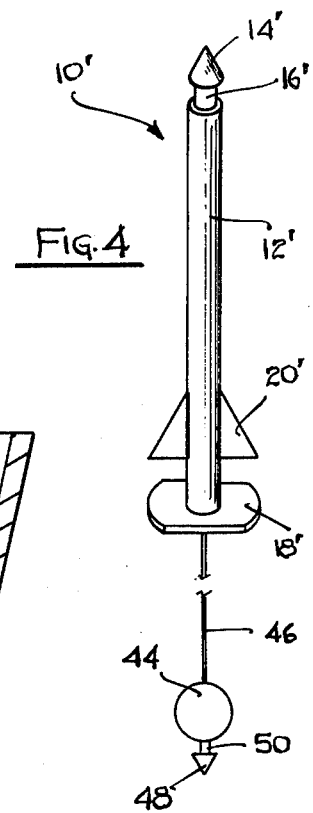
FIG. 4 is a perspective view of an alternate embodiment of a wick support made according to the present invention.

An alternate embodiment of a wick support 10' is shown in FIG. 4. The rigid portion 12', including a point 14', recess 16', fins 20' and handle 18' are identical in construction to the corresponding parts of the support 10 described above. A weight 44, which may be in the form of a solid button is attached to the handle 18' by means of a thin thread of material 46 as shown in FIG. 4. The weight 44 includes a point 48 having a narrow neck 50.

Figure 5:
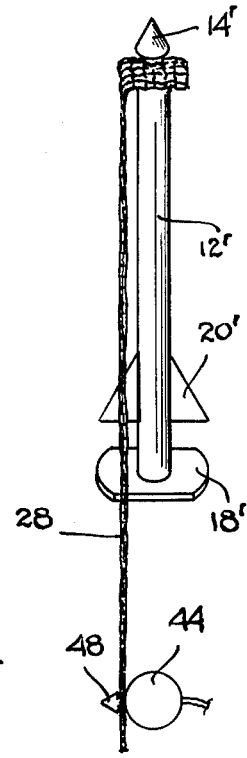
FIG. 5 is a perspective view of the wick support of FIG. 4, showing the wick attached.

To use the wick support 10', the user breaks the thread 46 at both ends, freeing the weight 44 from the handle 18'. The wick 28 is fastened to the section 12' by means of the point 14' in the same manner as described above. The other end of the wick 28 is fastened to the weight 44 by means of the point 48 as shown in FIG. 5. The support 10' is installed in the pot 30 in the same manner as the support 10. The weight 44 serves to ensure that the wick 28 is extended to the bottom of the outer pot 36. The wick support 10' may be molded using a variety of plastic materials including styrene.

While the invention is disclosed and particular embodiments are described in detail, it is not intended that the invention be limited solely to these embodiments. Many modifications will occur to those skilled in the art which are within the spirit and scope of the invention. It is thus intended that the invention be limited in scope only by the appended claims.

What is claimed is:

1. A wick support comprising an elongated rigid section having one end which includes means for holding a wick at a first location along the length of the wick, a handle section affixed to the other end of the rigid section and extending outward therefrom; and a flexible section projecting from the handle section in a direction opposite to that of the rigid section and terminating in a free end which includes a means for holding the wick at a second location along the length of the wick.

2. The wick support of claim 1 in which the means for holding a wick at a first location, and the means for holding the wick at a second location, include a point formed on the end of the rigid section and a point formed on the end of the flexible section, respectively.

3. The wick support of claim 1 further including flexible projections extending outward from the sides of the rigid section adjacent the handle section so that when the rigid section is inserted through an opening in a plant pot, the flexible projections pass through the opening and lock the rigid section into the pot.

* * * * *